US006148205A

United States Patent [19]
Cotton

[11] Patent Number: 6,148,205
[45] Date of Patent: Nov. 14, 2000

[54] METHOD AND APPARATUS FOR SECURE REGISTRATION WITHIN AN IN-HOME WIRELESS NETWORK

[75] Inventor: Timothy R. Cotton, Huntsville, Ala.

[73] Assignee: Motorola, Inc., Schaumburg, Ill.

[21] Appl. No.: 09/107,640

[22] Filed: Jun. 30, 1998

[51] Int. Cl.[7] .............................. H04Q 7/20; H04M 3/00
[52] U.S. Cl. .......................... 455/435; 455/462; 455/418
[58] Field of Search ................................ 455/435, 462, 455/463, 418, 419, 410, 411, 420, 522, 422, 403

[56] References Cited

U.S. PATENT DOCUMENTS

| | | | |
|---|---|---|---|
| 5,097,500 | 3/1992 | Itoh | 455/411 |
| 5,463,659 | 10/1995 | Nealon et al. | 455/410 X |
| 5,802,467 | 9/1998 | Salazar et al. | 455/420 |
| 5,898,386 | 4/1999 | Kaihatsu | 340/829.69 |

*Primary Examiner*—Dwayne D. Bost
*Assistant Examiner*—Tracy M. Legree
*Attorney, Agent, or Firm*—Hugh C. Dunlop

[57] ABSTRACT

A method for secure registration of a access device (400) having a receiver (418) and a transmitter (420) transmitting at an operational RF power level with a base station (200) having a receiver (218) and a transmitter (216) in which the base station reduces its operational RF power level to a registration RF power level and transmits a registration invitation message (610) to an access device (400), wherein the base station (200) after receiving a registration response message (614) from the access device (400) restores its power level to the operational RF power level.

13 Claims, 8 Drawing Sheets

METHOD AND APPARATUS FOR SECURE REGISTRATION WITHIN AN IN-HOME WIRELESS NETWORK

FIELD OF THE INVENTION

This invention relates generally to registration of devices in a network and specifically to secure registration of a device within an in-home wireless network.

BACKGROUND OF THE INVENTION

There exist many approaches to registering a device with a base station that have been used in cellular communication networks operating over a wide area and cordless telephones used in a home. The approaches used in cellular communication networks depend on the cellular phone having a unique identification that is entered into a database by network operators. In addition to physically entering a unique identification for a phone into a database, a cordless telephone can register with its base station when it is placed in a cradle at the base station. Both of the above methods of registration have problems being when adapted to a wireless in-home networks.

An in-home network may consist of many diverse devices and be continually changing as consumers remove or replace existing devices with new devices. The possibility of a consumer entering a wrong identification code for a device is high. With the possibility of multiple wireless in-home networks operating within the same house, an input error could result in a device not communicating or the base communicating with a wrong device. In addition to the possibility of error in data that is input by a consumer, there is the added cost and complexity of having a network management console for entering the identification codes for different devices. Furthermore, the cordless phone method of registering a base station with a handset by placing the handset in a cradle connected to the base station has problems of scalability and connectivity. A cradle is designed for one type of device only. In an in-home wireless network, a diverse number of consumer devices may be connected on the network. The devices can include refrigerators, stereo receivers, telephones, computers, and thermostats to name only a few. A cradle for a phone would not be suitable for a computer or stereo.

Another problem with the cordless phone's method of registration is physical contact between the base station and handset. Once again, this method would be impractical with a diverse group of consumer products and require additional circuitry for supporting a physical connection to a base station. Neither of the methods discussed above addresses the need to securely register a diverse group of consumer products within an in-home wireless network.

Therefore, there exists a need for a method and apparatus for secure registration within an in-home wireless network that requires minimal consumer intervention.

DETAILED DESCRIPTION OF THE PREFERRED EMBODIMENT

The present invention provides a method and apparatus for secure registration of a device within an in-home wireless network. The apparatus has a transmitter capable of transmitting at a relatively high RF power level during normal operations and a relatively low RF power level when registering with a second device or base station. The apparatus or base station may be configured to initiate registration in a number of ways as discussed below.

Figure 1:
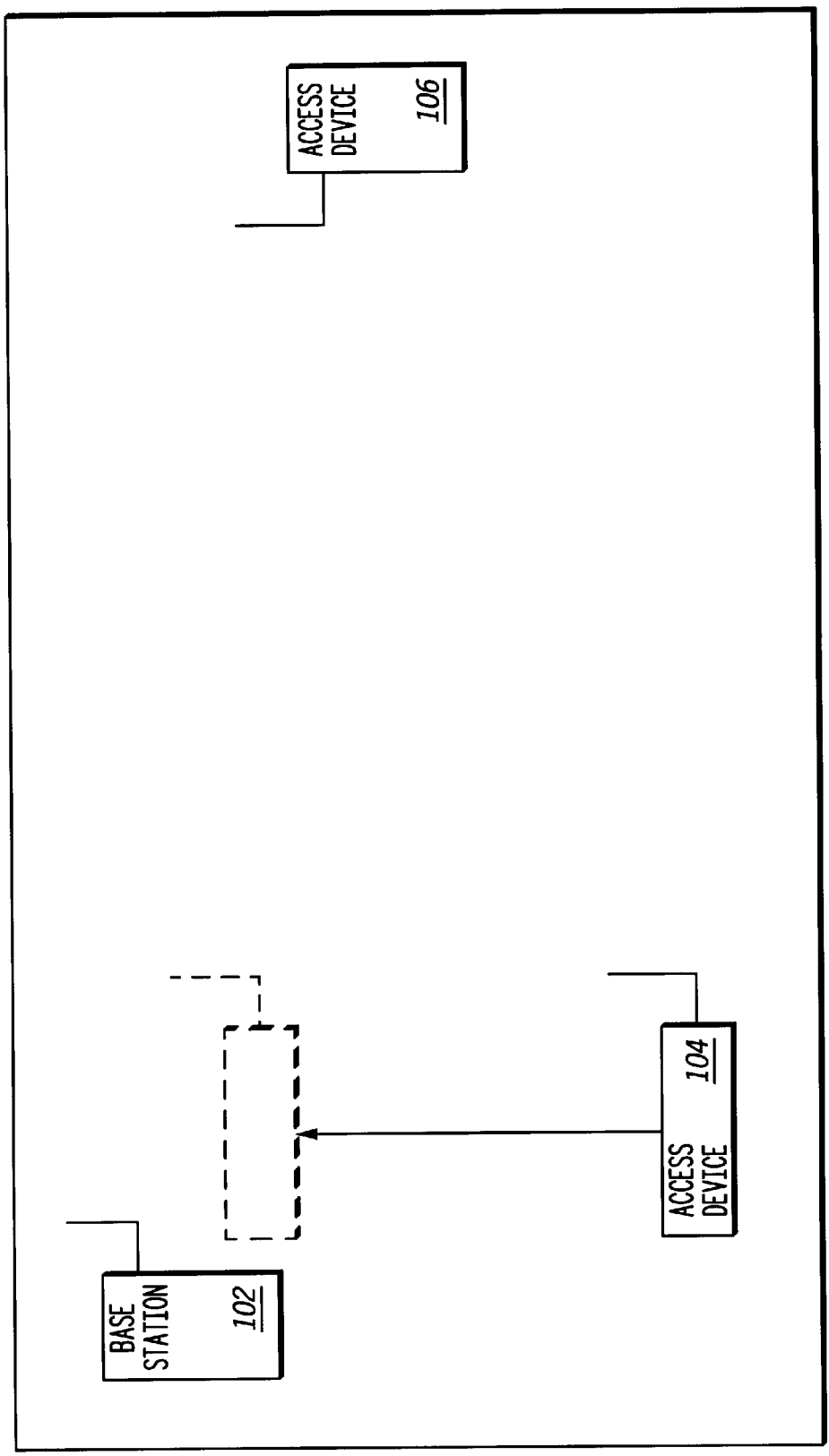
FIG. 1 is a diagram of an in-home wireless network residing within a single room in accordance with a preferred embodiment of the invention.

Referring to FIG. 1, a diagram of an in-home wireless network residing within a single room 100 in accordance with a preferred embodiment of the invention. The in-home network has a base station 102 and two access devices 104, 106. The access devices 104, 106 can be phones, stereos, television sets, or any other consumer or electrical devices.

For an access device 104, 106 to register with a base station 102 it must be placed next to the base station 102. An access device 104 is moved close to the base station 102 and then registration occurs. The other access device 106 will not register or re-register with the base station 102 because it is out of range of the base station 102 transmitting at a low RF power level when registration is initiated.

Figure 2:
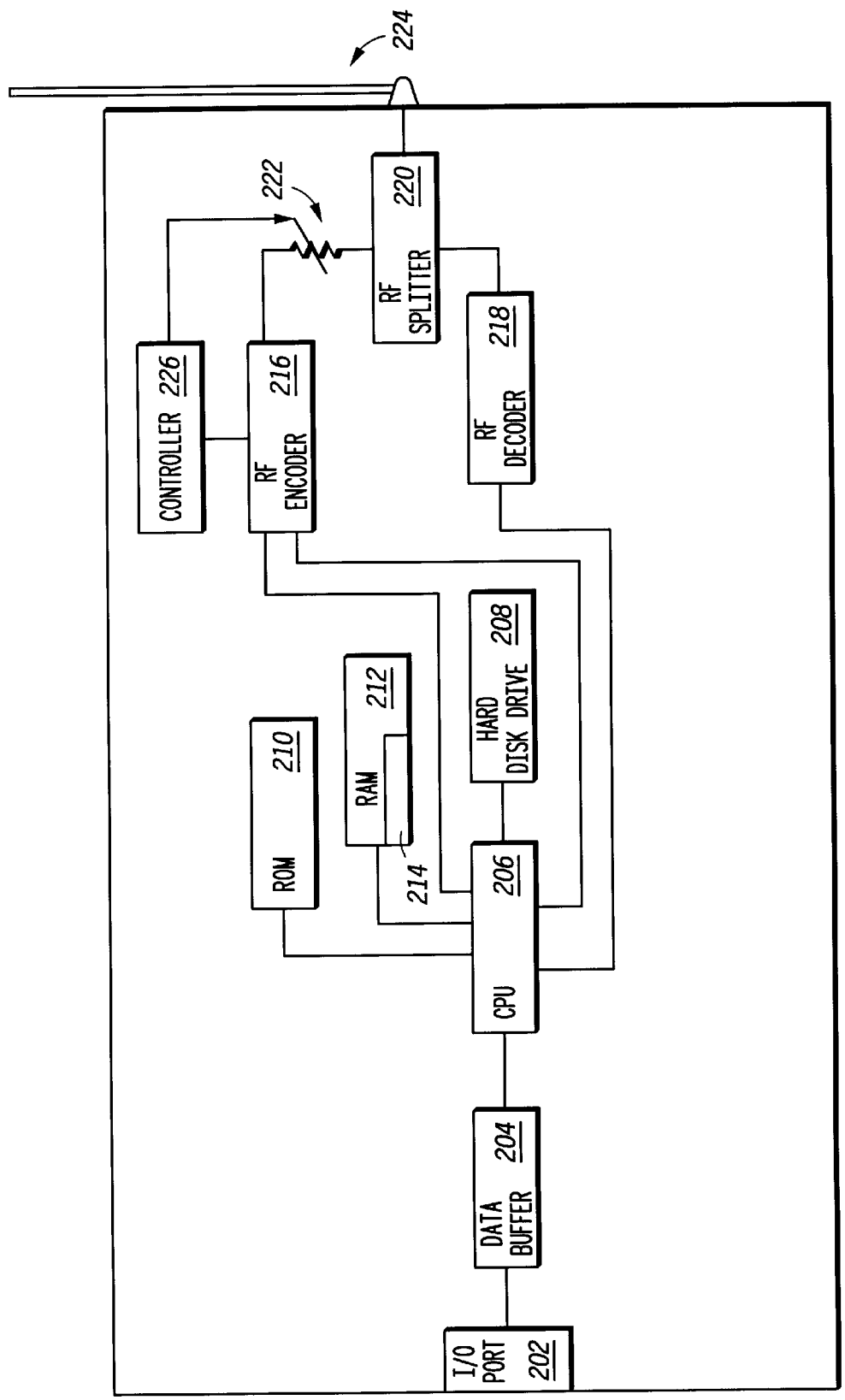
FIG. 2 is a block diagram of a base station in accordance with a preferred embodiment of the invention

FIG. 2 shows a block diagram of a base station 200 in accordance with a preferred embodiment of the invention. The base station 200 is represented with a data input/output port 202. The input/output port has a data buffer 204 for temporary storage of received and transmitted data. The data buffer 204 is connected to a central processing unit (CPU) 206 commonly referred to as a microprocessor. The CPU 206 is connected to multiple memory elements including secure data stored in secure memory such as read only memory (ROM) 210, but may be a type of electronically erasable programmable read only memory (EEPROM). Random Access memory (RAM) 212 is a general memory that is used by the CPU 206 for running programs and temporary storage. Within the RAM memory, addresses exist including a memory address for temporary identification numbers 214. The CPU 206 may also have a hard disk drive 208 for storage of software programs and large amounts of data.

The CPU 206 also has connections to a RF encoder 216 and a RF decoder 218 for generating and receiving RF signals. The RF encoder 216 and RF decoder 218 are coupled to a RF splitter 220 that is connected to an antenna 224. The CPU 206 also has a second source connected to the RF encoder 216 that activates the registration power control. RF encoder 216 is connected to a controller 226 that controls a load 222 which switches the RF power output of the base station 200.

The base station 200 normally transmits at a relatively high RF power level so all devices in an in-home network can receive transmissions from the base station 200. The base station 200 receiving a registration request message can initiate the registration of an access device with a base station 200. The registration request message is received through the antenna 224 and routed to the RF decoder 218 by the RF splitter 220. The CPU 206 then processes the registration request message. An alternative way of initiating registration would have the base station 200 at fixed intervals attempt to register all devices located next to the base station 200.

The CPU 206 may use an encryption algorithm when registering an access device. The encryption algorithm is stored in secure memory 210 and accessed as needed by the CPU. The CPU 206 then generates a temporary identification number to be sent to the registering device. The CPU 206 stores the temporary identification number at a memory address 214 in the RAM memory 212.

The CPU 206 then provides a registration signal to the RF encoder 216 signifying that registration of an access device is in progress. The RF encoder 216 notifies the controller 226 to reduce the RF transmit power level. The controller 226 switches in a load 222 that causes the RF transmit power and the RF signal transmitted through the RF splitter 220 and antenna 224 to be reduced, thus reducing the range of the base station 200. The CPU 206 then sends a registration message to the RF encoder 216 for transmission through the RF splitter 220 and antenna 224.

If the registering access device is next to the base station 200 and receives the registration message, the registering access device will respond with a registration response message. The registration response message will be received at the antenna 224 of the base station 200 and routed by the RF splitter 220 to the RF decoder 218 which will send the data contained in the registration response message to the CPU 206. The CPU 206 will then use the temporary identification number stored at an address 214 in RAM 212 to authenticate the data. If the received data is encrypted, the CPU 206 will use an encryption key stored in the secure memory 210 to decrypt and then authenticate the message. If the authentication of the data proves to be from the access device that requested to register, the CPU 206 will store a permanent identification for the access device in a database located in RAM 212 and on the hard disk 208, if a hard disk is present.

Figure 3:
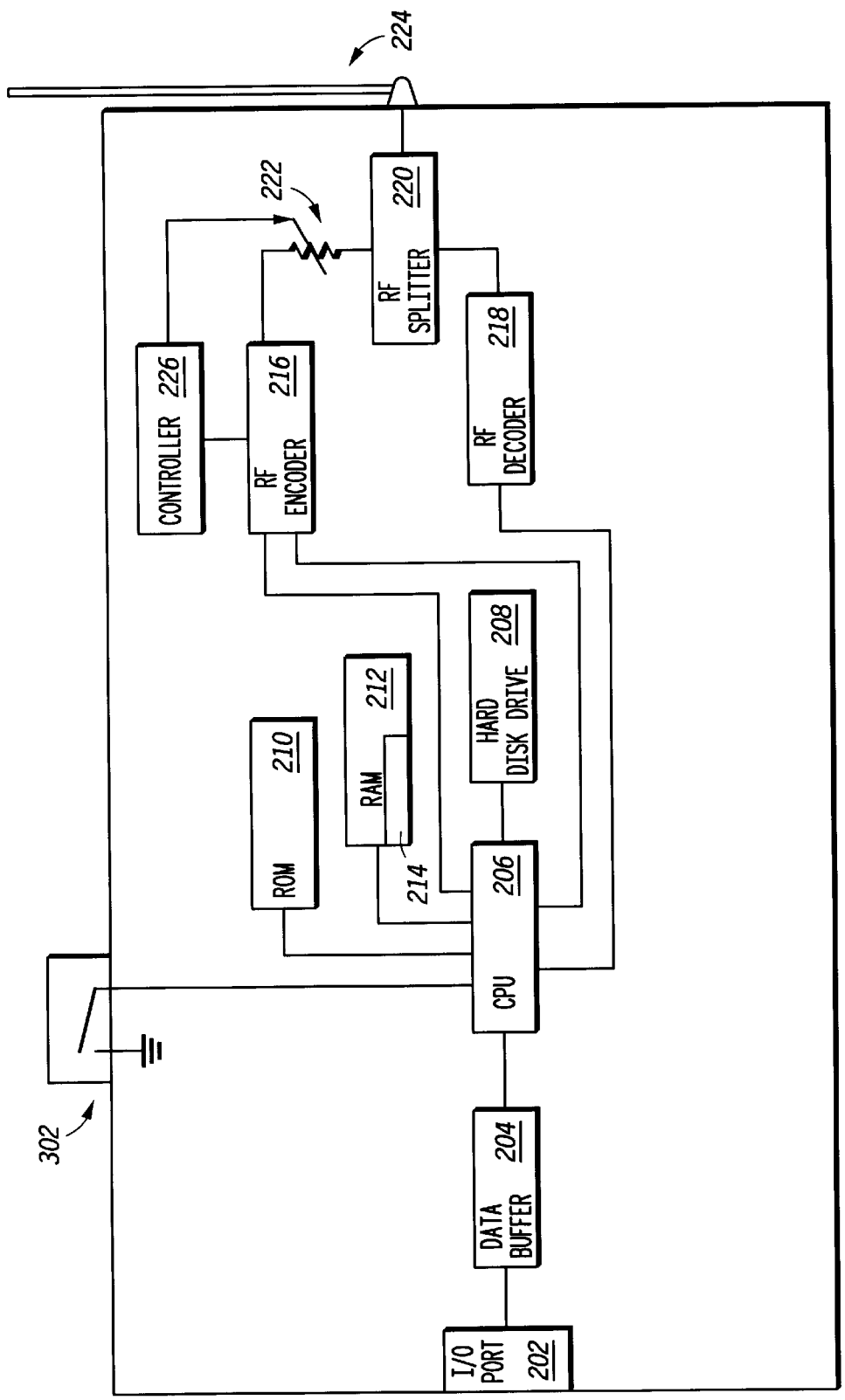
FIG. 3 is a block diagram of a base station having a switch interface in accordance with a preferred embodiment of the invention.

In FIG. 3, a block diagram of a base station 300 having a switch interface in accordance with a preferred embodiment of the invention is shown. The base station 300 has all the elements of base station 200 as described above with the additional element of a switch 302 connected to the CPU 206. Registration is initiated in this embodiment of the invention by activating switch 302, which causes the CPU 206 to start the process of sending a registration message to an access device as described above in FIG. 2.

Figure 4:
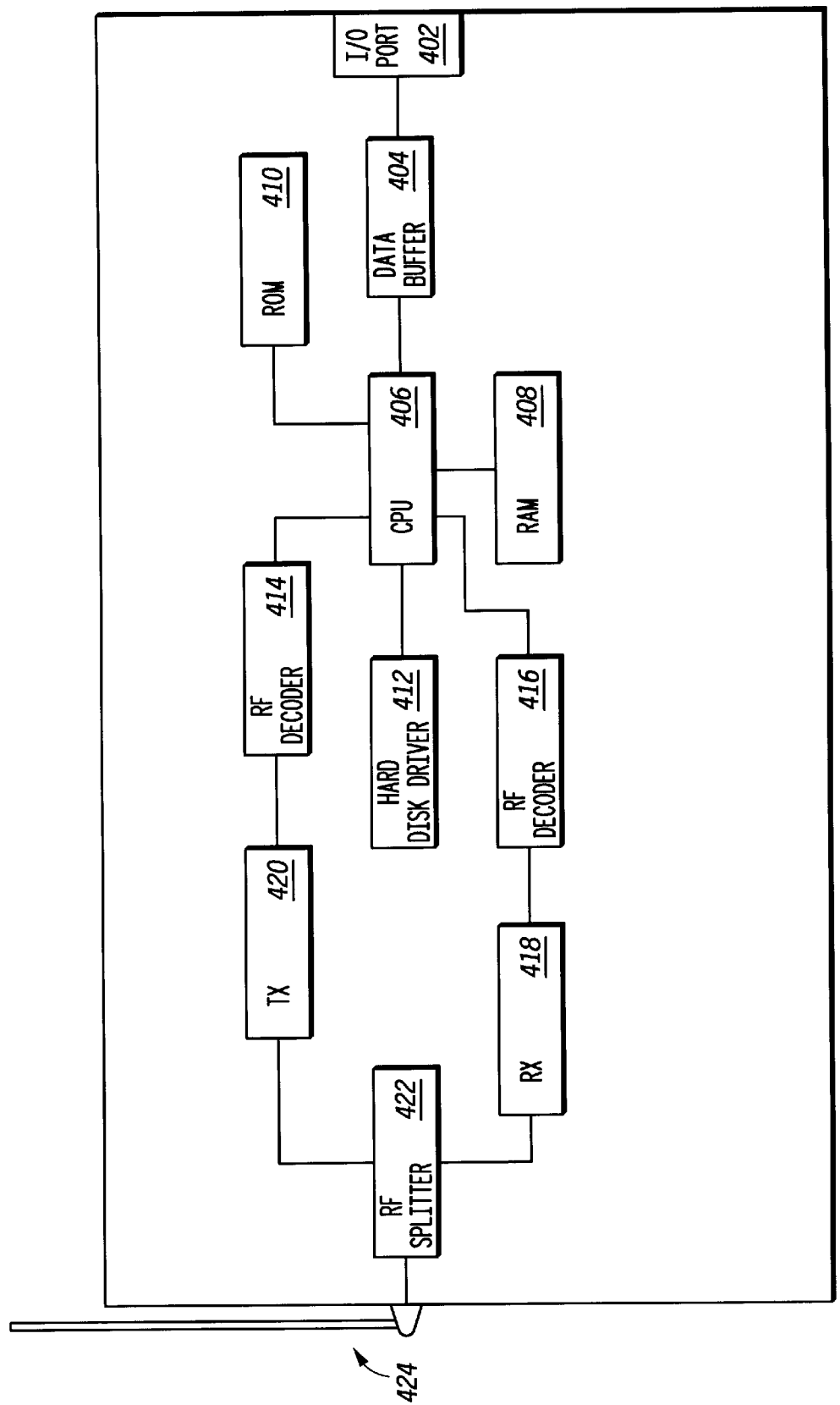
FIG. 4 is a block diagram of an access device in accordance with a preferred embodiment of the invention.

FIG. 4 is a block diagram of an access device 400 in accordance with a preferred embodiment of the invention. The access device 400 has a data input/output port 402 for sending and receiving data. The input/output port 402 is connected to a data buffer 404 that is also connected to a CPU 406. The CPU 406 is connected to a number of types of memory including, but not limited to ROM/EEPROM 410, and RAM 408. The CPU 406 is optionally connected to a disk drive 412 for storing large amounts of data and software programs. The CPU 406 can send data to a RF encoder 414 that encodes the data into a RF signal that is in turn sent to a RF transmitter 420. The RF transmitter 420 is connected to a RF splitter 422 that is attached to an antenna 424. The access device 400 can receive RF signals through an antenna 424. The received RF signal is then routed to the RF receiver 418 by the RF splitter 422. The RF receiver 418 receives the RF signal and transfers the RF signal to the RF decoder 416. The data from the RF decoder 416 is then available for the CPU 406 to process.

The access device 400 registers with a base station by being moved next to the base station 200. The access device either initiates registration by sending a registration request message or the base station 200 initiates registration by sending a registration message to the access device 400. The processing for either method is similar once the access device 400 receives a registration message.

The registration message is received in a RF signal at the antenna 424 and routed to the RF receiver 418 by the splitter 422. The RF receiver 418 receives the RF signal and removes a modulated RF carrier and sends a RF signal that is not modulated to the RF decoder 416. The RF decoder 416 decodes the unmodulated RF signal into data that the CPU 406 will recognize as a registration request message.

If the access device uses encryption and authentication for added security during registration, the CPU 406 will store the authentication data received in the RAM 408 and apply any encryption algorithms, which are stored in ROM 410, required for secure communications with the base station 200. A person skilled in the art of data communications commonly knows encryption and authentication methods.

The CPU 406, in response to a registration message, will send a registration response message containing a unique identification for the access device 400. The CPU 406 will apply the appropriate encryption and authentication data to the registration response message if so required. The registration response message is sent from the CPU 406 to the RF encoder 414. The RF encoder 414 encodes the data into a RF unmodulated signal. The RF unmodulated signal is then sent from the RF encoder 414 to the RF transmitter 420. The RF transmitter combines the RF encoded signal with a RF carrier that is then sent through a RF splitter 422 and out over the air via the antenna 424.

Figure 5:
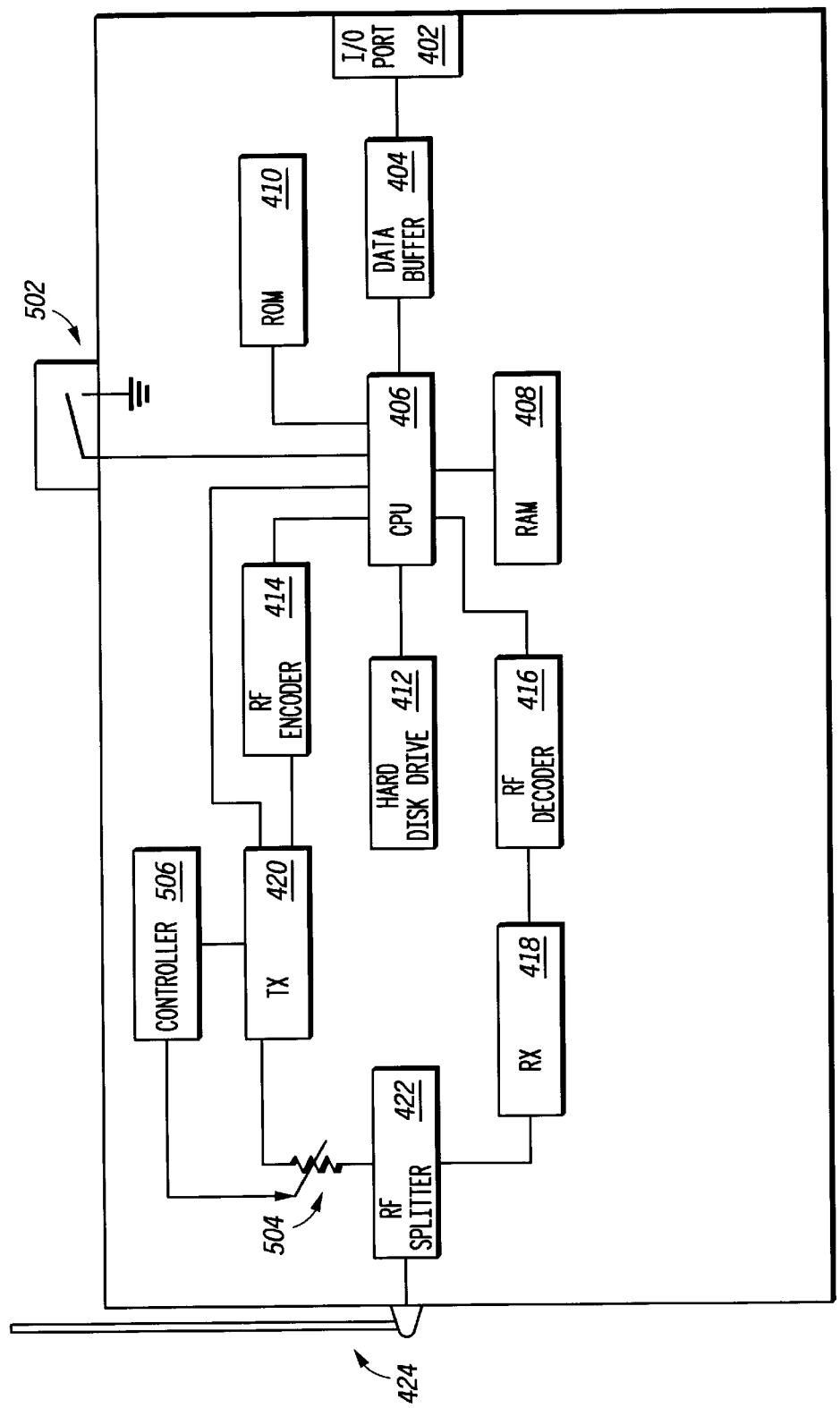
FIG. 5 is a block diagram of an access device having a switch interface and RF power control in accordance with a preferred embodiment of the invention.

Turning to FIG. 5, a block diagram of an access device 500 having a switch interface 502 and RF power control in accordance with a preferred embodiment of the invention. The access device 500 has the ability of reducing its RF power level during registration. In addition to the elements discussed in FIG. 4, the access device in FIG. 5 has a switch interface 502 connected to the CPU 406 that can initiate registration and a controller 506 that is connected to a load 504 that can change the transmit RF power level.

When the switch 502 is activated, the CPU 406 will provide a registration signal to the RF transmitter 420. The RF transmitter then activates the controller 506 to switch in the load 504, thus reducing the RF transmit power level. If the base station receives the registration message and responds to the access device 500 with a registration acknowledgement message, the CPU 406 will remove the registration signal from the RF transmitter 420 causing the controller 506 to remove the load 504. With the load 504 removed the RF power level with return to a normal operational level.

Figure 6:
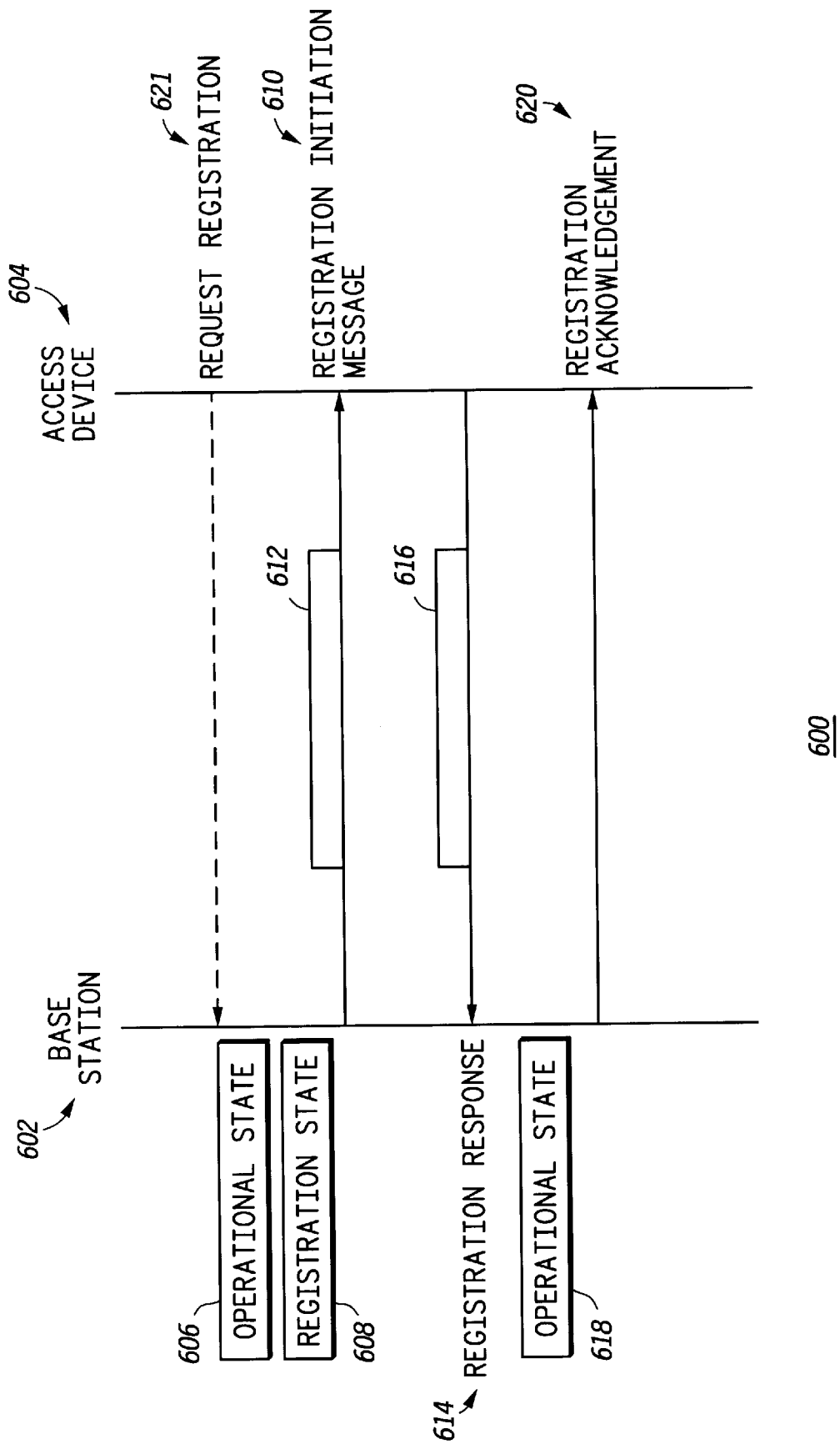
FIG. 6 is a message ladder diagram showing a base station sending a registration message at low power in accordance with a preferred embodiment of the invention.

FIG. 6 is a message ladder diagram 600 showing a base station 602 sending a registration initiation message 610 at low power in accordance with a preferred embodiment of the invention. The base station 602 starts in an operational state 606. The operational state 606 is a state when the transmitted RF signal is at a relatively high RF power level. The base station 602 transitions into a registration state 608 wherein the transmitted RF signal power level is reduced from the operational state 606. The base station 602 transmits a registration initiation message 610 containing registration data 612 to the access device 604.

Upon receiving the registration initiation message 610, the access device 604 responds with a registration response message 614. The registration response message 614 contains response data 616 for the base station 602. The base station 602 changes to the operational state 618 and registration of the access device is complete.

The base station 602 may send a registration acknowledgement message 620 which can be used by the access device 604 to notify a consumer that the access device 604 has been registered. An alternate approach of initiating registration would have the access device 604 sending a request for registration message 621 to the base station 602.

Figure 7:
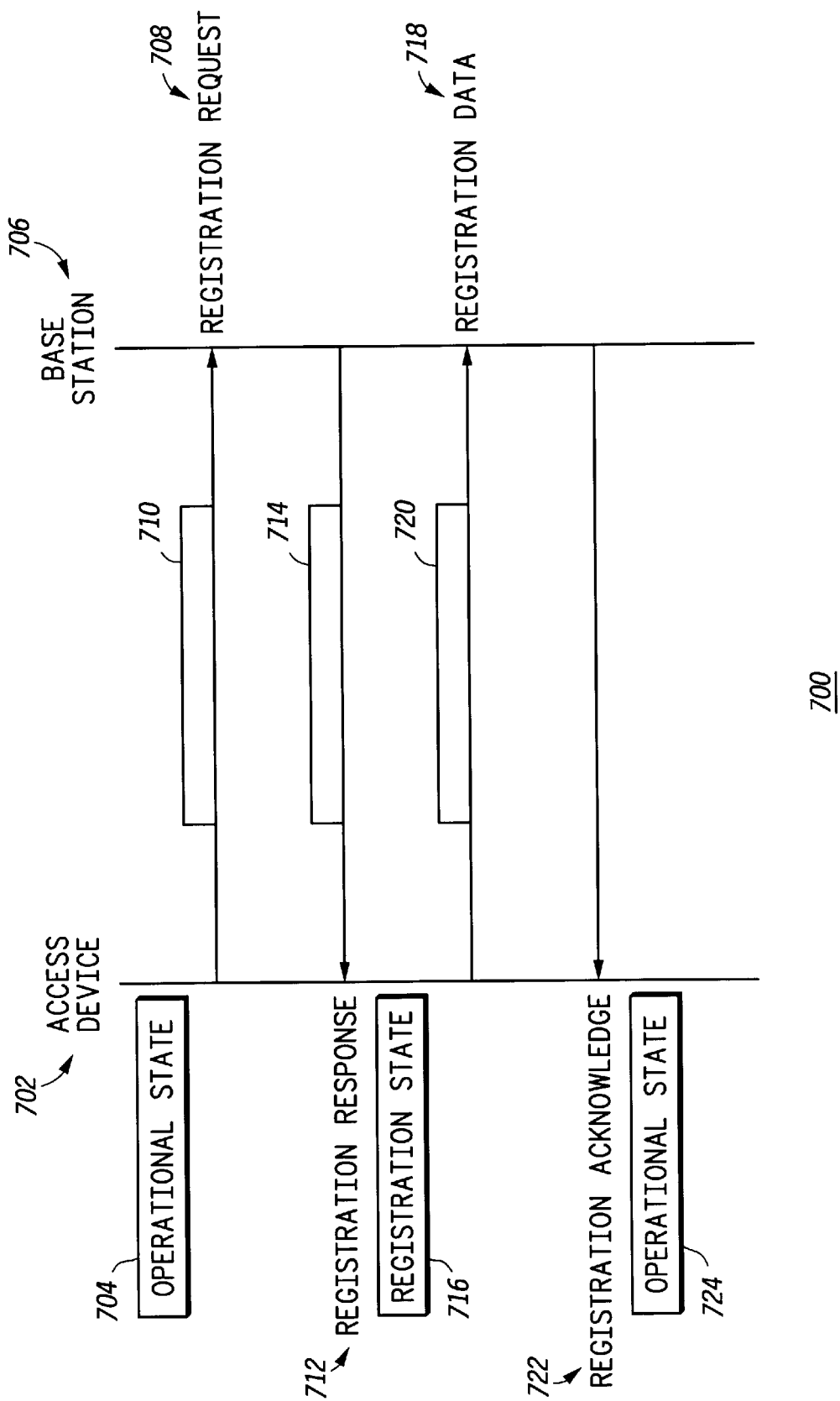
FIG. 7 is a message ladder diagram showing an access device sending a registration message at low power in accordance with a preferred embodiment of the invention.

FIG. 7 is a message ladder diagram 700 showing an access device 702 sending a registration data message 718 at low power in accordance with a preferred embodiment of the invention. The access device 702 is in a operational state 704 with the RF power level at a relatively high RF power level compared to the RF power level in the registration state 716. The access device 702 sends a registration request message 708 to the base station 706. The registration request message 708 can contain data 710 that is used for authentication or encryption. The base station 706 responds to the registration request message 708 with a registration response message 712. The registration response message 712 can contain data 714 for use with authentication and encryption.

The access device 702 upon receiving the registration response message 712 changes states from an operational state 704 to the registration state 716. The registration state is a state where the RF power level is reduced so only devices next to each other will register. The access device 702 then proceeds to securely transmit registration data 720 in a registration data message 718 to the base station 706. The base station 706 responds to the registration data message 718 by sending a registration acknowledge message 722 to the access device 702. When the access device 702 receives the registration acknowledge message 722 the state of the access device 702 is changed from the registration state 716. The transmit RF power level is increased from a relatively low RF power level to a relatively high RF power level of normal operation.

Figure 8:
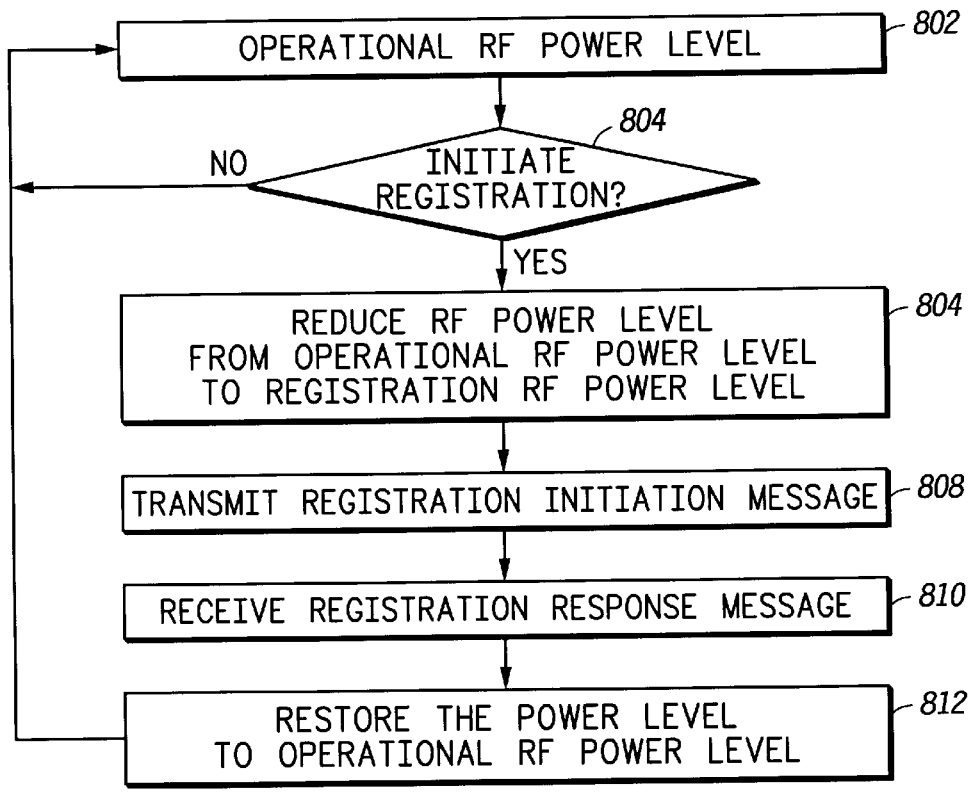
FIG. 8 is a flow diagram of a method of active registration in accordance with the preferred embodiment of the invention.

In FIG. 8 a flow diagram 800 of the method of active registration in accordance with the preferred embodiment of the invention is shown. The method starts with the device at an operational RF power level 802. The next step 804 is to determine if registration is being initiated. If registration is not being initiated the RF power level will remain at the operational RF power level 802. If registration is initiated, the RF power level is reduced 806 relative to the operational RF power level.

The next step is to transmit the registration initiation message 808 at the low RF power level. Following the registration initiation message, the device receives a registration response message 810. When the registration response message is received the registration of the device is complete and the final step is to restore the power level to operational RF power level 812.

Figure 9:
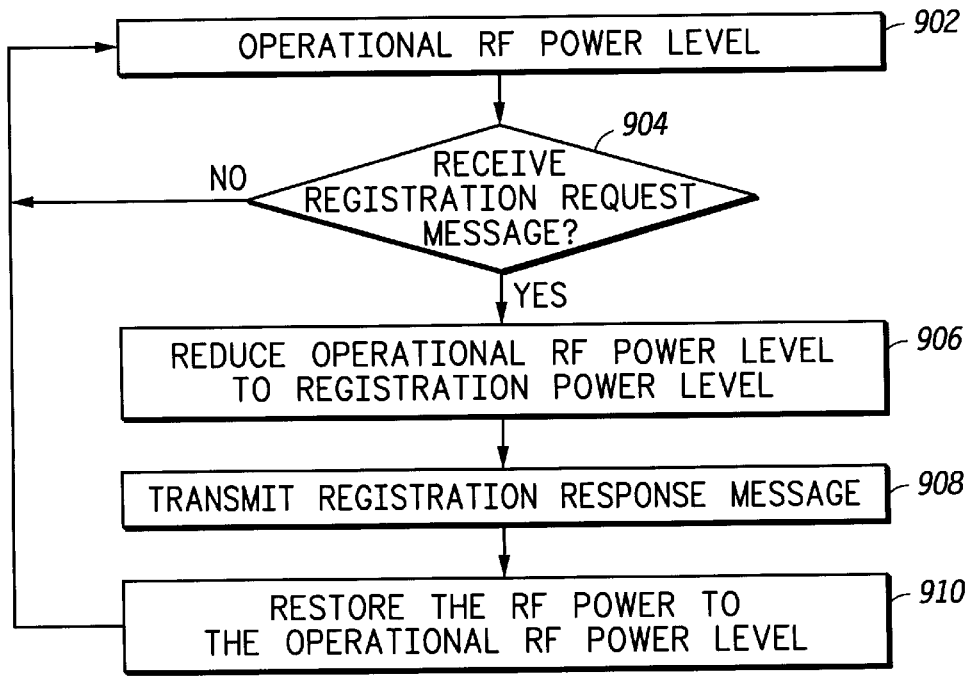
FIG. 9 is a flow diagram of a method of passive registration in accordance with the preferred embodiment of the invention.

FIG. 9 is a flow diagram 900 of a method of passive registration in accordance with the preferred embodiment of the invention. A device starts with the RF power level being at an operational RF power level 902. The operational RF power level is a relatively high power level in relationship to a registration RF power level.

The next step 904 is to check if the device has received a registration request message. If a registration request message is not received, the RF power level continues at the operational RF power level of step 902. If a registration request message is received, the next step 906 is to reduce the operational RF power level to the registration power level.

Following reducing the RF power level step 906, the device transmits a registration response message 908. The registration response message will contain data that may be encrypted and the receiving device also may authenticate the registration response message. The final step 910 is to restore the RF power to the operational RF power level.

By having the registration data transmitted at low power to a receiving device that is next to the registering device, a high degree of security is achieved. The ability to have multiple in-home networks within the same home is also achieved by having a low power registration state on the base station, access device, or both the base station and access device. Finally, the ability to register a device without having a consumer enter identification numbers into a database increases the ease of configuring an in-home network.

What is claimed is:

1. A method for registration of a first device having a receiver and a transmitter transmitting at an operational RF power level comprising:

reducing the operational RF power level of the first device to a registration RF power level;

transmitting a registration invitation message from the first device to a second device;

receiving at the first device a registration response message from the second device; and restoring the first device to the operational RF power level.

2. A method according to claim 1, wherein the step of reducing the operational RF power level is preceded by a step of activating a switch on the first device.

3. A method according to claim 1, wherein the step of reducing the operational RF power level is preceded by a step of expiring of a fixed time interval.

4. A method according to claim 1, wherein the registration response message contains encrypted data.

5. A method according to claim 1, wherein the first device and the second device are located in an in-home wireless network.

6. A method for registration of a first device having a receiver and a transmitter transmitting at an operational RF power level comprising:

receiving a registration request message at the first device from a second device;

reducing the operation RF power level of the first device to a registration RF power level;

transmitting a registration response message from the first device to the second device; and restoring the first device to the operational RF power level.

7. A method according to claim 6, wherein the registration response message contains encrypted data.

8. A method according to claim 6, wherein the first device and the second device are located in an in-home wireless network.

9. An apparatus comprising:
a transmitter having a transmit power control element switching a power output of the transmitter between a first, relatively high, level and a second, relatively low, level;
a first source providing operational signals to the transmitter;
a second source providing registration signals to the transmitter; and
a controller coupled to the transmit power control element causing the output power to be switched to the first level when operational signals are provided from the first source and to the second level when registration signals are provided from the second source.

10. An apparatus according to claim 9, further comprising a switch having a first state and a second state, the switch coupled to the second source, wherein the switch in the second state initiates the second source to provide registration signals to the transmitter.

11. An apparatus according to claim 9, further comprising a timer having a fixed interval, the timer coupled to the second source, wherein the timer initiates the second source to provide registration signals to the transmitter.

12. An apparatus according to claim 9, further comprising a receiver coupled to the controller wherein the controller is responsive to receiving a registration request, and initiates the second source to provide registration signals to the transmitter.

13. An apparatus according to claim 9, further comprising a switching means for switching between a first state and a second state, coupled to the second source, wherein the second state causes the second source to provide registration signals to the transmitter.

* * * * *